United States Patent
Choy et al.

(10) Patent No.: US 9,407,522 B2
(45) Date of Patent: Aug. 2, 2016

(54) INITIATING DATA COLLECTION BASED ON WIFI NETWORK CONNECTIVITY METRICS

(71) Applicant: Aruba Networks, Inc., Sunnyvale, CA (US)

(72) Inventors: Bo Choy, Cupertino, CA (US); Choh Mun Kok, San Jose, CA (US); Kenneth Chan, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 101 days.

(21) Appl. No.: 14/170,319

(22) Filed: Jan. 31, 2014

(65) Prior Publication Data
US 2015/0222507 A1    Aug. 6, 2015

(51) Int. Cl.
*H04L 12/26* (2006.01)
*H04W 76/00* (2009.01)
*H04W 24/04* (2009.01)

(52) U.S. Cl.
CPC ........ *H04L 43/0811* (2013.01); *H04L 43/0829* (2013.01); *H04L 43/0864* (2013.01); *H04W 24/04* (2013.01); *H04W 76/00* (2013.01)

(58) Field of Classification Search
CPC ......... H04L 9/32; H04W 12/06; H04W 48/18
USPC ................... 370/328, 329, 338; 455/411, 434
See application file for complete search history.

(56) References Cited

U.S. PATENT DOCUMENTS

| | | | | |
|---|---|---|---|---|
| 7,590,246 | B2 * | 9/2009 | Calmels et al. | 380/270 |
| 8,917,661 | B2 * | 12/2014 | Hsu et al. | 370/328 |
| 2008/0072047 | A1 * | 3/2008 | Sarikaya et al. | 713/171 |
| 2010/0313241 | A1 * | 12/2010 | Lee et al. | 726/3 |
| 2014/0071967 | A1 * | 3/2014 | Velasco | 370/338 |
| 2014/0280865 | A1 * | 9/2014 | Albertson et al. | 709/224 |
| 2014/0323087 | A1 * | 10/2014 | Huang et al. | 455/411 |

\* cited by examiner

*Primary Examiner* — Dang Ton
*Assistant Examiner* — Sai Aung
(74) *Attorney, Agent, or Firm* — Hewlett Packard Enterprise Patent Department

(57) ABSTRACT

The present disclosure discloses a method and network device for initiating data collection based on WiFi network connectivity metrics. Specifically, detects that a value for a WiFi network connectivity metric for a WiFi connection between a client device and a WiFi network meets a particular criteria. Responsive to determining that the value meets the particular criteria, the disclosed system initiates a data collection process for collecting data associated with one or more devices while the WiFi network connectivity metric meets the particular criteria. The determining operation may be performed by a network device in response to receiving a request from a user of the client device. Also, the disclosed system stores the data collected while the WiFi network connectivity metric meets the particular criteria.

15 Claims, 6 Drawing Sheets

| CONTROLLER IDENTIFIER 320 | CLIENT IDENTIFIER 340 | DATA 360 | TIME STAMP 380 |
|---|---|---|---|
| IP<sub>CONTROLLER1</sub> | MAC<sub>CLIENT1</sub> | D1 | t1 |
| IP<sub>CONTROLLER2</sub> | MAC<sub>CLIENT1</sub> | D2 | t2 |
| ... ... | ... ... | ... ... | ... ... |

| CONTROLLER IDENTIFIER 320 | CLIENT IDENTIFIER 340 | DATA 360 | TIME STAMP 380 |
|---|---|---|---|
| $IP_{CONTROLLER1}$ | $MAC_{CLIENT1}$ | D1 | t1 |
| $IP_{CONTROLLER2}$ | $MAC_{CLIENT1}$ | D2 | t2 |
| … … | … … | … … | … … |

INITIATING DATA COLLECTION BASED ON WIFI NETWORK CONNECTIVITY METRICS

FIELD

The present disclosure relates to data collection in an enterprise local area network. In particular, the present disclosure relates to initiating data collection based on WiFi network connectivity metrics in enterprise local area networks.

BACKGROUND

Wireless stations experiencing intermittent connectivity or poor performance are complex issues to troubleshoot effectively. Effective troubleshooting requires that the environmental data be captured exactly when the wireless station is experiencing difficulty so that the particular environmental conditions can be tested.

Currently, there is no mechanism by which a client device can initiate collection of environmental data for an administrator to later review and troubleshoot. In an example, an administrator attempts to debug or troubleshoot a building zone where users have complained about wireless connectivity. Sometimes, the administrator may need to contact network vendor to further the investigation, which would lead to additional delay in the debugging data collection. Thus, the network conditions may have changed during this troubleshooting process, making it difficult for the administrator or vendor support professionals, to replicate the errors and/or connectivity problems. Hence, it is crucially important to capture the network environmental data at real-time when the client device is experiencing the connectivity difficulties.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
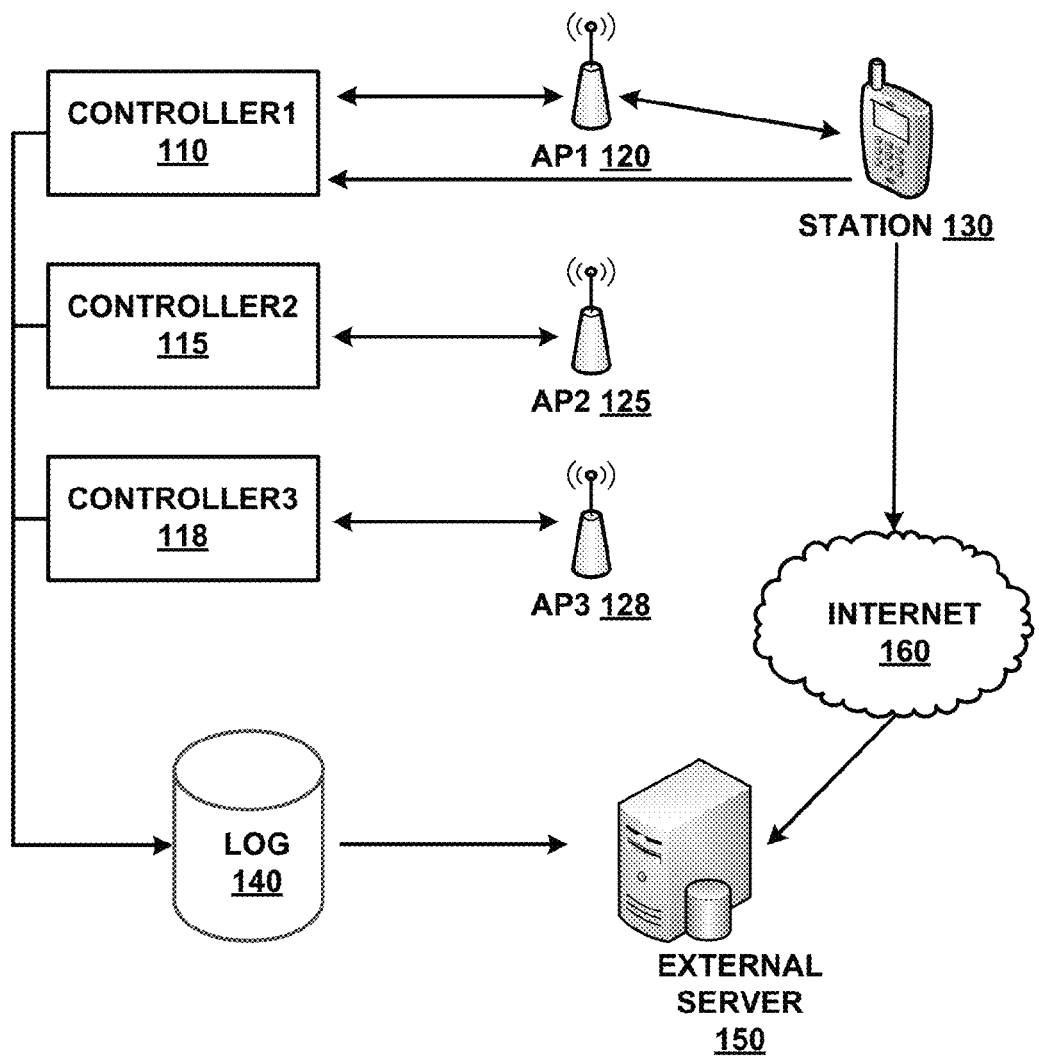
FIG. 1 illustrates an exemplary network computing environment according to embodiments of the present disclosure.

In the following description, several specific details are presented to provide a thorough understanding. While the context of the disclosure is directed to data collections in enterprise networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to data collection in an enterprise local area network. In particular, the present disclosure relates to initiating data collection based on WiFi network connectivity metrics in enterprise local area networks.

According to the present disclosure, a wireless station initiates the capturing of environmental conditions immediately in response to intermittent connectivity or poor performance. The wireless station may initiate the capture of environmental conditions based on user input (e.g., from a frustrated user) or based on detection of errors as indicated by a monitored parameter exceeding a particular threshold. As a part of each association response and/or re-association response, the wireless station receives a destination address and/or identifier that is to be used for transmitting information regarding environmental conditions for troubleshooting purposes.

With the solution provided herein, a disclosed system detects that a value for a WiFi network connectivity metric for a WiFi connection between a client device and a WiFi network meets a particular criteria. Responsive to determining that the value meets the particular criteria, the disclosed system initiates a data collection process for collecting data associated with one or more devices while the WiFi network connectivity metric meets the particular criteria. In some embodiments, the determining operation is performed by a network device in response to receiving a request from a user of the client device. Also, the disclosed system stores the data collected while the WiFi network connectivity metric meets the particular criteria.

Moreover, according to solution provided herein, a disclosed client device monitors a value for a WiFi network connectivity metric for a WiFi connection between the client device and a WiFi network, and detects that the value meets a particular criteria. Responsive to determining that the value meets the particular criteria, the disclosed client device transmits, to one or more network devices corresponding to the WiFi network, via a mobile network, a notification associated with the value meeting the particular criteria.

Problem Scenarios

This section illustrates various scenarios where problem of timely and appropriate data collection may exist. For example, in a Large Public Venue (LPV) or conference type of WiFi access environment, a user experiencing connectivity issues may not know where and how to report the connectivity issues. Even if the user reports the connectivity issues, by the time the issues are investigated, the network environment has changed and the issues may not be reproducible. In addition, multiple users in LPV may experience the same connectivity issues at the same time, and thus the IT helpdesk or network support professionals may be overwhelmed with the clustered user requests.

As another example, in large campuses or warehouses, users of WiFi networks may not have any networking knowledge to help the network administrator to debug the issues. In addition, reporting networks issues often is a time consuming process.

Moreover, IT helpdesk agents in most network environments will not have administrative access to the core networking devices, such as the mobility controller, to perform the necessary debugging. Instead, the IT helpdesk agents would rely on vendor support professionals' help to access the core networking devices indirectly or temporarily depending on the problems that they face. The lack of access to core networking resources may also cause difficulties in real-time network environment debugging data collection. This is even more so when multiple core networking devices, e.g., network controllers, are involved. It is difficult to determine which controller the client device is connected to while having the network connectivity issues.

Furthermore, enabling the correct class of debugging options also require extensive knowledge in the product and technology, and require coordination with end users at the location where the issue is reported. On the other hand, network engineers and/or vendor support professionals with such specialized knowledge might not be available 24/7 365 days around to debug the issue at real-time with direct end user contacts.

Sometimes, debugging network connectivity issues for a WiFi user requires physical presence of IT professionals at the location where the issue is reported in order to help end users to debug the issue or to replicate the issue. Yet it may not always be possible for the IT professional to be present physically at the location with network issues at the real-time when the issues occur.

Finally, network vendor support engineers/professionals may not have any data to analyze the issues, because either the user who reported the issue is not available or the event is not re-producible. Therefore, the network vendor support engineers/professionals may have no data to provide any factual finding to customers. Even in cases where network vendor support engineers/professionals are sent on-site to help collect the relevant debugging data, the issues are often not reproducible, leaving network vendor engineers/professionals on-site for long period of times to perform mundane tests in order to replicate the issues.

Network Computing Environment

FIG. 1 illustrates an exemplary network computing environment according to embodiments of the present disclosure. Specifically, FIG. 1 includes a plurality of core networking devices such as network controllers (e.g., controller1 110, controller2 115, controller3 118, etc.). Each network controller is further connected with one or more access points. For example, AP1 120 is connected to controller1 110; AP2 125 is connected to controller2 115; AP3 128 is connected to controller3 118, etc. The access points provide network access and services to a plurality of client devices, including station 130.

Furthermore, FIG. 1 also includes one or more logs 140, which can be stored either internally in one or more network controllers, or in an external storage that the network controllers can access. Log 140 stores real-time debugging data information, including various network environmental parameters, timestamps, client-specific information, etc. to facilitate the investigation of network connectivity issues that clients may have reported.

Log 140 can be further synchronized to an external server 150 for storage, aggregation and analysis. In some embodiments, when station 130 has alternative ways to connect to Internet 160 (e.g., via a cellular network), the system allows station 130 to directly report network problem and provide desired data collected at station 130 to external server 150 through Internet 160.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Moreover, in the exemplary network depicted in FIG. 1, a number of client devices are connected to the access points in the WLAN. Note that, client devices may be connected to the access points via wired or wireless connections. As a client device roams from one physical location to another location within the network, the client device may disassociate with a previous access point and associate with a new access point in the network. The previous access point and the new access point may be connected to the same or different network controllers.

Network Data Collection

The approach described in the present disclosure provides an end-to-end data collection solution such that real-time debugging data can be collected and analyzed to help the clients solve their network connectivity issues. The disclosed system allows a network administrator to define what types of data are to be collected when a client device initiates a request.

In some embodiments, a client side application or software is installed on the client device, such as a personal computer, a tablet, and/or a smartphone device, etc. When the user is experiencing connectivity and/or performance issues, he/she can launch the application or software to initiate the data collection process.

In some embodiments, an Access Point (AP) advertises the controller identifier, such as an Internet Protocol (IP) address, in a network frame (e.g., IEEE 802.11 Association Response frame or Re-Association frame). This controller identifier is to inform the station which controller the AP is connected to. When the station is roaming to a new location, the new controller identifier, such as an IP address, will be learned by the station through the same process. Therefore, it is important to note that the techniques in the present disclosure allow a station or client device to be fully aware of the identity of the network controller that manages the AP with which it is associated to. Hence, when the station encounters a network connectivity issue, it has the knowledge of which controller should be the receiver of the data collection request.

A. Collection Process

Figure 2A:
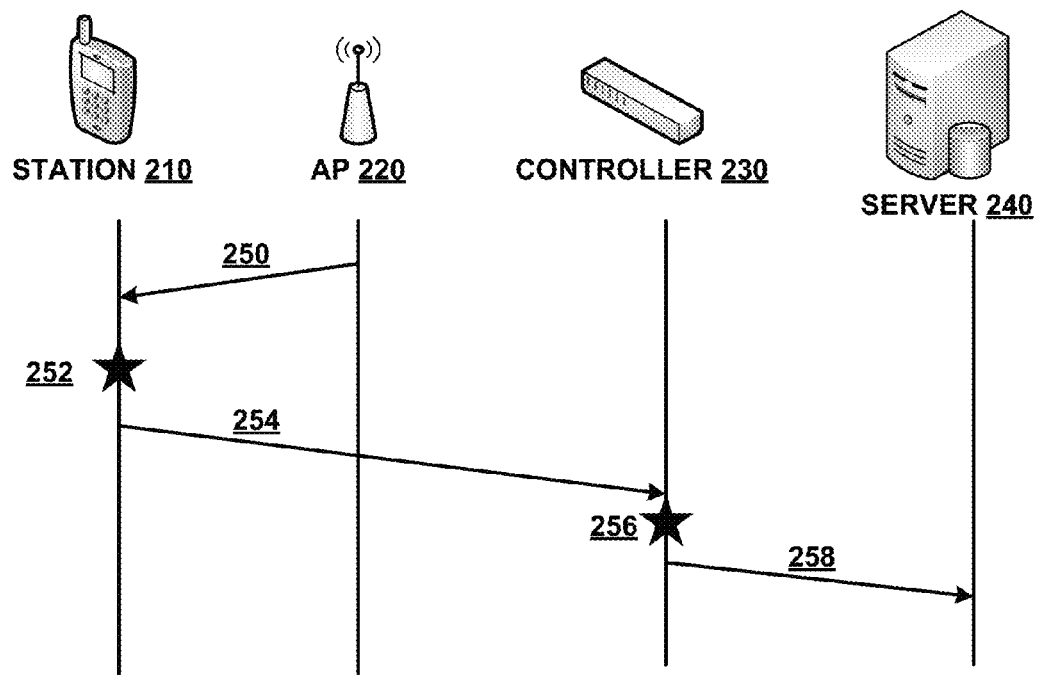
FIGS. 2A-2B illustrates exemplary network data collection according to embodiments of the present disclosure.
Figure 2B:
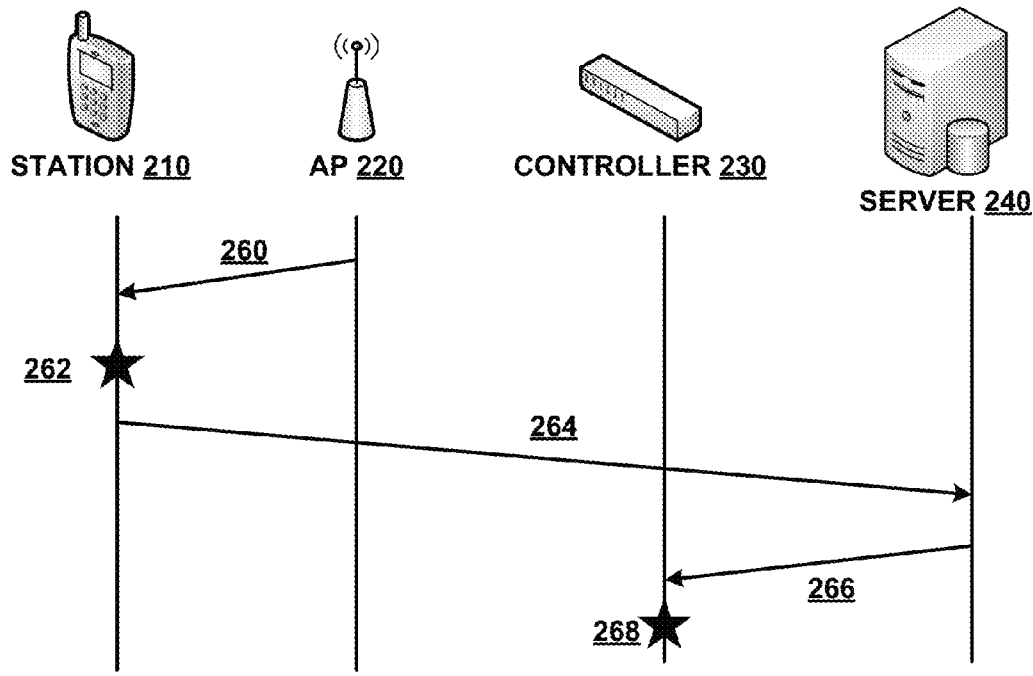

FIGS. 2A-2B illustrates exemplary network data collection according to embodiments of the present disclosure. In particular, FIG. 2A includes station 210, AP 220, controller 230, and external server 240. Specifically, Station 210 is associated with AP 220 via a wireless or wired link. AP 220 is connected to controller 230. Further, controller 230 is connected to server 240, which stores collected data from controller 230 and station 210, as well as other network/client devices. Server 240 also facilitates aggregation and analysis of the collected data.

During operations, AP 220 first transmits a network message 250 to station 210. Network message 250 includes at least an identifier identifying controller 230 that AP 220 is connected to. In some embodiments, network message 250 can be an association response frame, or a re-association response frame. Also, the identifier can be an IP address of controller 230. In some embodiments, the identifier is encrypted in network message 250.

When station 210 experiences a network connectivity issue 252, e.g., an intermittent network connection, station 210 may initiate a data collection request 254 to controller 230 based on the identifier previously received from AP 220. In some embodiments, station 210 also starts to collect and capture local device data as well as additional network information upon detection of network connectivity issue 252. The data may be collected by a locally installed software application. The locally installed software application also keeps track of the last known controller identifier. With each received network message 250, the software application updates the parameter tracking the last known controller identifier. Station 210 may determine what data to collect based on a pre-configured application profile.

Moreover, the local data collection and/or the data collection request to the controller may be triggered automatically if one or more predefined conditions are satisfied. In some embodiments, station 210 may periodically collect certain data. The collected data will subsequently be directly or indirectly transmitted to external server 240 for further processing. If station 210 has connection to the wireless local area network (WLAN), station 210 may transmit collected data to controller 230, which will pass the data to external server 240. If station 210 has no connection to the WLAN, but has other network connection to Internet, station 210 may directly transmit collected data to external server 240.

Upon receiving data collection request, controller 230 will then authenticate 256 the data collection request. The authentication of data collection request is needed to avoid client devices randomly trigger the network debugging and/or data collection process. In some embodiments, controller 230 can authenticate the data collection request from station 210 based on the user identity associated with station 210. In some embodiments, the data collection request from station 210 also includes an enterprise domain username and password, based on which the data collection request will be authenticated by controller 230. Controller 230 may be configured with a number of authentication methods, including but not limited to, Remote Authentication Dial In User Service (RADIUS), Lightweight Directory Access Protocol (LDAP), local database, etc.

In some embodiments, when multiple client devices send data collection request to controller 230, controller 230 refuses to authenticate any additional data collection requests once a pre-determined threshold number of data collection requests have been authenticated. In some embodiments, controller 230 refuses to authenticate any additional data collection request if the current number of concurrent debugging sessions has exceeded a predefined threshold value. Thus, the system can limit the number of concurrent debugging sessions with the authentication process, thereby preventing denial of services to the controller, in the event that a large number of users experiencing same the network problems flooding the data collection requests to the same controller at the same time. Moreover, when the system limit of concurrent debugging sessions is reached, a message may be automatically sent to all or affected network users indicating to the network users that the system is currently undergoing connectivity issues and that no further data collection request needs to be sent on the same issues.

In some embodiments, the controllers may maintain a whitelist and/or blacklist and authenticate the data collection requests based on the whitelist and/or blacklist. For example, the whitelist may be configured to allow data collection requests from only certain selected clients in cases with known network issues affecting a set of clients. As another example, the whitelist can be time-based, e.g., allow only data collection requests sent by the client devices during a particular event, such as a trade show or stadium event. As another example, blacklist may include a list of known client device identifiers corresponding to the client devices that have abused the data collection system.

In some embodiments, controller 230 sends a confirmation message to station 210 upon successful authentication of data collection request 254. Station 210 may proceed to transmit station-collected data to controller 230 only after receiving the confirmation message. Further, once the data collection request 254 is authenticated 256, controller 230 will both initiate data collection at controller 230 and/or instruct AP 230 to start data collection. In some embodiments, controller 230 may instruct multiple APs to collect data in response to a station-initiated data collection request.

Note that, when multiple data collection requests are received from the same station 210, the system will only trigger one data collection process at controller 230, which is the controller that AP 220 is connected to at the time when network connectivity issue is experienced by station 210. However, if station 210 has been involved in inter-controller roaming (e.g., station 210 has been disassociated with a first AP connected to controller 1 and associated with a second AP connected to controller 2), the system may trigger data collection at multiple controllers (e.g., both controller 1 and controller 2). In this case, because station 210 knows the identifiers of both controller 1 and controller 2, station 210 may send two separate data collection requests to controller 1 and controller 2 respectively.

In another example, station 210 is initially associated with a first AP that is connected to controller 1, and subsequently associated with a second AP that is connected to controller 2. If station 210 experiences network connectivity after (rather than during) the roaming from the first AP to the second AP is completed, the system will only trigger controller 2 to collect data upon receiving the data collection request from station 210.

Finally, controller 230 will transmit collected data to external server 240 for further processing, such as data aggregation and analysis. In some embodiments, the data analysis at server 240 may indicate that additional data needs to be collected. Thus, controller 230 may instruct either AP 220 or station 210 to collect additional data. In some embodiments, these additional data may be collected at a fixed interval for monitoring of network performance.

FIG. 2B illustrates another exemplary network data collection according to embodiments of the present disclosure. FIG. 2B includes station 210, AP 220, controller 230, and external server 240. Specifically, Station 210 is associated with AP 220 via a wireless or wired link. AP 220 is connected to controller 230. Further, controller 230 is connected to server 240, which stores collected data from controller 230 and station 210, as well as other network/client devices. Server 240 also facilitates aggregation and analysis of the collected data.

During operations, AP 220 first transmits a network message 260 to station 210. Network message 260 includes at least an identifier identifying controller 230 that AP 220 is connected to. In some embodiments, network message 260 can be an association response frame, or a re-association response frame. Also, the identifier can be an IP address of controller 230. In some embodiments, the identifier is encrypted in network message 260. Station 210 may have a pre-installed piece of software application that tracks the last known controller identifier.

When station 210 experiences a network connectivity issue 262, e.g., an intermittent network connection, station 210 may initiate a data collection request or notification 264 based on the identifier previously received from AP 220. In some embodiments, station 210 also starts to collect and capture local device data as well as additional network information upon detection of network connectivity issue 262. The data may be collected by a locally installed software application. Station 210 may determine what data to collect based on a pre-configured application profile.

In some scenarios, station 210 may have lost the WLAN connectivity and thus unable to directly transmit to controller 230 data collection request/notification and collected data 264. If, however, station 210 has an alternative way to connect to the Internet, station 210 can transmit data collection request/notification and/or collected data to external server 240 using, for example, Hypertext Transfer Protocol Secure (HTTPS) or Simple Mail Transfer Protocol (SMTP). For example, when station 210 lost connectivity to WLAN, the data collected by station 210 indicates that no signals can be received from any access points in the neighborhood. In another example, station 210 may collect data indicating that station 210 can receive signals from AP 220, but the received signal strength (e.g., RSSI) is very low. If station 210 transmits such collected data to external server 240, server 240 (or controller 230 that is connected to server 240) can analyze the data and determine that there is a network coverage problem at the physical location of station 210. In some embodiments, a user of station 210 can send a secure email notification or a mobile text message to external server 240, which can be a server residing in a cloud, upon detection of network connectivity issues. Alternatively, the data collected could be store at station local storage and transmit to the controller or the log server when the connectivity is restored.

External server 240 can then forward data collection request 266 to the corresponding network controller, e.g., controller 220. Upon receiving data collection request 266 from server 240, controller 230 authenticates data collection request 266. Upon authentication, controller 230 may initiate the data collection process locally and may also instruct one or more access points (e.g., AP 220) to start collecting network data.

The ability of station 210 to use an alternative network for transmitting its locally collected data and/or initiate data collection request via external server 240 allows for real-time collection of such data even while station 210 has completely lost network connectivity with the WLAN.

B. Data Collection Log

Figures 3, 4:
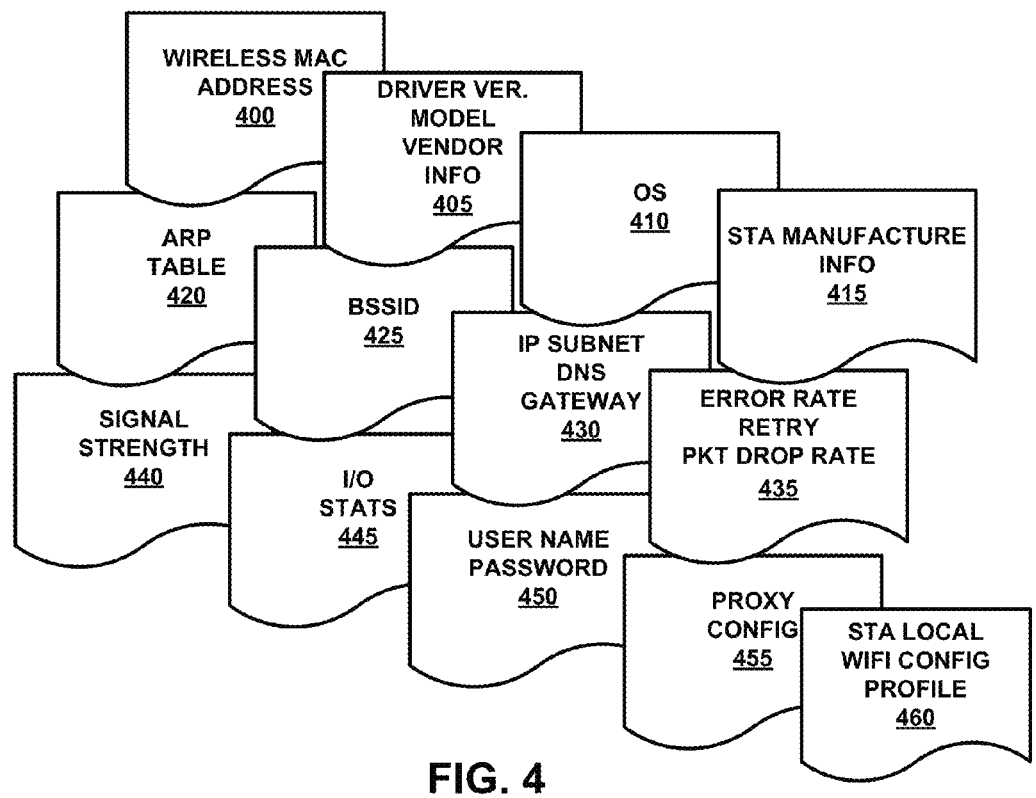
FIG. 3 illustrates an exemplary data collection log according to embodiments of the present disclosure.
FIG. 4 illustrates exemplary collected data according to embodiments of the present disclosure.

FIG. 3 illustrates an exemplary data collection log according to embodiments of the present disclosure. Data collection log illustrated in FIG. 3 includes at least controller identifier 320, client identifier 340, data 360, timestamp 380, etc. For example, the first entry of the data collection log may indicate that data D1 is collected at time t1 by controller 1 (whose Internet Protocol (IP) address is $IP_{CONTROLLER1}$) upon request by a client device (whose Media Access Control (MAC) address is $MAC_{CLIENT1}$). As another example, the second entry of the data collection log may indicate that data D2 is collected at time t2 by controller 2 (whose Internet Protocol (IP) address is $IP_{CONTROLLER2}$) upon request by the same client device (whose Media Access Control (MAC) address is $MAC_{CLIENT1}$).

In some embodiments, the log as illustrated in FIG. 3 can be stored locally inside a controller. In some embodiments, the log can be pushed to an external server. The external server is capable of storing and analyzing collected data 360.

Timestamp 380 indicates a data collection request triggering time. This corresponds to a relevant time period when the client device identified by client identifier 340 is experiencing the network connectivity issues. For example, a client may be having connectivity issues that were caused by problems with controller 2. The client device may thereafter have associated with another AP that is connected controller 1 and reported the issues it encountered previously. In this example, the relevant time period corresponds to the time period when the client was associated with the AP that is connected to controller 2. Note that, the relevant time period may not be precisely at the moment when the client device is experiencing the network connectivity issues, but reasonably close to or overlap with the time period that the client device experiences the network connectivity issues.

C. Collected Data

FIG. 4 illustrates exemplary collected data according to embodiments of the present disclosure. Specifically, data that can be collected by a client device or initiated to be collected by the client device include, but are not limited to, wireless MAC address 400; driver version, Network Interface Card (NIC) model and other vendor information 405; Operating System (OS) 410; station manufacture information 415; Address Resolution Protocol (ARP) table 420; wireless Basic Service Set Identifier (BSSID) 425; IP address/subnet mask, Domain Name System (DNS) address, gateway Internet Protocol (IP) address 430; error rate, retry number, packet drop rate 435; signal strength 440; Input/Output (I/O) statistics 445; user name and password 450; proxy configuration 455; station's local WiFi configured profiles 460; etc.

The client software application may be triggered to collect the above data upon detecting that the value for the WiFi network connectivity metric meets one or more of the following criteria: (a) determining that a packet drop rate for packets transmitted to the client device or transmitted by the client device is above a threshold packet drop rate value; (b) determining that a signal level for wireless signals associated with the client device is below a threshold signal level value; (c) determining that a latency value for wireless signals associated with the client device is greater than a threshold latency value; (d) determining that a number of retries for wireless signals associated with the client device is greater than a threshold retry value; (e) determining that a Round Trip Time (RTT) for data transmitted to and received from the client device is above a threshold RTT value; (f) determining that a packet error rate for the packets transmitted to the client device or transmitted by the client device is above a threshold error rate value; etc.

In addition, the client-side software application will have default set of operations and options to enable or disable specific class of debugging. Possible classes of debugging may include, but are not limited to, enabling per-client debugging; collecting AP radio statistics; enabling wired packet capture; enabling wireless packet capture; enable spectrum monitoring; enable location tracking; collecting datapath counters such as session, tunnel and frame statistics; etc.

When a client device initiates a trigger, the receiving controller needs to determine what data to be collected. These options allow a network administrator to configure what kind of data is desired to be collected by network devices upon receiving a data collection request from a client device, because the system may not need the client device to collect every piece of available information. Thus, after the network administrator configures the default set of operations and options described above, the data collection request received by the controller from the client will include such option settings, allowing the controller to determine what data to collect in response to the specific client's data collection request. Different client devices may be configured with different sets of operations and option values.

Subsequently, if a controller determines that it needs to collect more information, the controller can then send a message with instructions to the client device. The instructions can indicate what additional data need to be collected and transmitted to the controller by the client device. As an example, the network administrator may instruct the client device to perform a ping test and transmit the result back to the controller. Alternatively, the controller may instruct the client device to download or upload a specific file from or to the AP or controller or a specific hosted cloud server to measure the data transfer rate, packet loss rate, error rate and etc. The controller may also instruct the client device to perform client side packet capture for certain information, such as received signal strength indicator (RSSI) at a predetermined time interval (e.g., 30 s), etc.

The data collection at the controller will stop when one or more of the following conditions occur: (a) the station is disassociated from the networks; (b) the user ages out from user table; (c) the user manually stopped the data collection by sending a stop notification to the controller; (d) after the default period of time (e.g., 30 minutes) or custom period of time configured by a network administrator; etc.

The information collected will be compiled, encrypted and compressed before sending to the controller via SMTP or HTTPS. Collected data could be store locally in the flash or could be transferred to an external server in relevant period of time. The controllers and/or the external server will provide options to allow WLAN network engineers or vendor support engineers/professional to pull relevant information for a specific client during a specific time period at specific location(s) and start analyzing on data collected.

Upon completion of data collection, the disclosed system can notify and report the issue to an IT helpdesk agent, a network administrator, vendor network engineer or professional, etc. This may be performed by automatically logging a system helpdesk ticket on behalf of the client. In some embodiments, the system only sends a notification to the network administrator if the number of client devices reporting the specific network connectivity has exceeded a threshold value.

Automated Aggregation and Analysis

Embodiments of the present disclosure further analyze and group all collected data received from wireless stations based on shared environmental conditions. In an example, all environmental data received from wireless stations within zone X at time Y is aggregated for analysis by a system administrator. In another example, all environmental data received from wireless stations having connectivity issues while associated with AP N is aggregated for analysis by a system administrator. In another example, network-side conditions during a low connectivity period for a wireless station are stored in association with the data received from the wireless station to provide a system administrator the complete picture for troubleshooting purposes. Also, if a controller detected that the client device's driver version is outdated, the controller may send an instruction to the client device for updating the driver on the client device.

Figure 5:
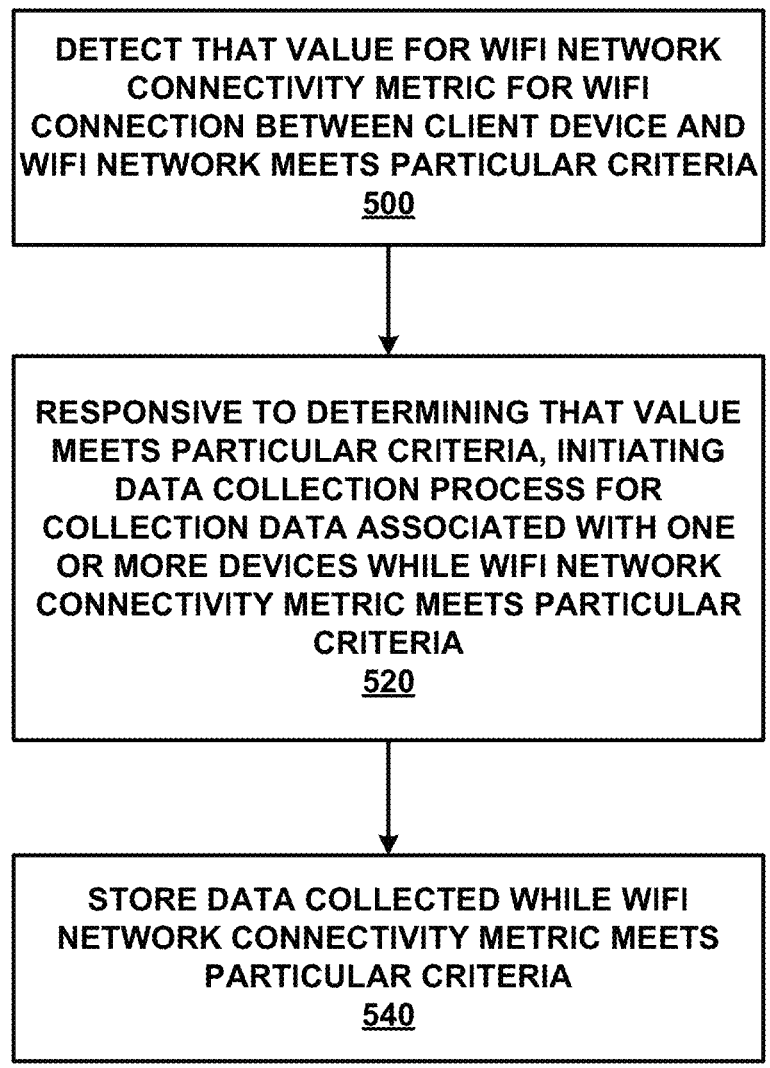
FIG. 5 shows a flowchart for an exemplary process for initiating data collection based on WiFi network connectivity metrics according to embodiments of the present disclosure.

Processes for Initiating Data Collection Based on WiFi Network Connectivity Metrics FIG. 5 shows a flowchart for an exemplary process for initiating data collection based on WiFi network connectivity metrics according to embodiments of the present disclosure. During operations, the disclosed system detects that a value for a WiFi network connectivity metric for a WiFi connection between a client device and a WiFi network meets a particular criteria (operation 500). Responsive to determining that the value meets the particular criteria, the disclosed system initiates a data collection process for collecting data associated with one or more devices while the WiFi network connectivity metric meets the particular criteria (operation 520). In some embodiments, the determining operation is performed by a network device in response to receiving a request from a user of the client device. Also, the disclosed system stores the data collected while the WiFi network connectivity metric meets the particular criteria (operation 540).

In some embodiments, the initiating operation (operation 520) is performed by the client device. In some embodiments, the initiating operation (operation 520) is performed by a network device monitoring the WiFi network connectivity metric for the WiFi connection between the client device and the WiFi network.

In some embodiments, detecting that the value for the WiFi network connectivity metric meets the particular criteria (operation 500) includes one or more of: (a) determining that a packet drop rate for packets transmitted to the client device or transmitted by the client device is above a threshold packet drop rate value; (b) determining that a signal level for wireless signals associated with the client device is below a threshold signal level value; (c) determining that a latency value for wireless signals associated with the client device is greater than a threshold latency value; (d) determining that a number of retries for wireless signals associated with the client device is greater than a threshold retry value; (e) determining that a Round Trip Time (RTT) for data transmitted to and received from the client device is above a threshold RTT value; (f) determining that a packet error rate for the packets transmitted to the client device or transmitted by the client device is above a threshold error rate value; etc.

In some embodiments, the data associated with one or more devices may include data collected by the client device. In some embodiments, the data associated with the one or more devices includes data collected by an access point with which the client device is associated while the WiFi network connectivity metric meets the particular criteria. In some embodiments, the data associated with the one or more devices comprises data collected by a controller configuring an access point with which the client device is associated while the WiFi network connectivity metric meets the particular criteria. In some embodiments, the data associated with the one or more devices includes data collected by client devices other than said client device, the other client devices being selected based on a physical proximity or network proximity with said client device.

In some embodiments, initiating the data collection process (operation 520) is further based on determining that (a) a request for initiating the data collection process is received from the client device and (b) the client device is authorized to initiate the data collection process.

The data may be used to debug one or more connectivity issues resulting in the value for the WiFi network connectivity metric meeting the particular criteria. Further, the WiFi connection between the client device and the WiFi network can be a WiFi connection between the client device and any access point corresponding to the WiFi network.

In addition, the disclosed system may collect the data associated with the one or more devices while the WiFi network connectivity metric meets the particular criteria. Also, the client device may collect data that is specified by a network device. In some embodiments, the client device is configured to transmit the data to a network device identified by one or more devices associated with the WiFi network.

Figure 6:
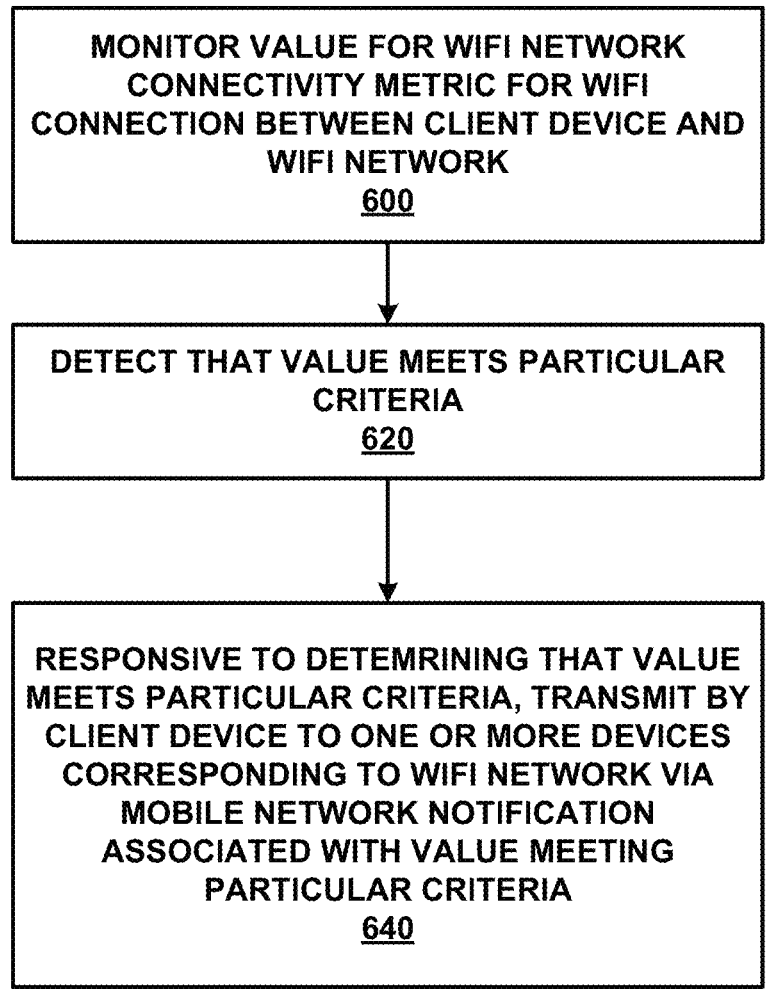
FIG. 6 shows a flowchart for another exemplary process for initiating data collection based on WiFi network connectivity metrics according to embodiments of the present disclosure.

FIG. 6 shows a flowchart for another exemplary process for initiating data collection based on WiFi network connectivity metrics according to embodiments of the present disclosure.

During operations, the disclosed client device monitors a value for a WiFi network connectivity metric for a WiFi connection between the client device and a WiFi network (operation 600). The disclosed client device detects that the value meets a particular criteria (operation 620). Responsive to determining that the value meets the particular criteria, the disclosed client device transmits to one or more network devices corresponding to the WiFi network, via a mobile network a notification associated with the value meeting the particular criteria (operation 640). Further, the disclosed client device may stop the data collection process responsive to determining that the value no longer meets the particular criteria.

In some embodiments, the notification includes an indication that the client device has lost connectivity with the WiFi network. In some embodiments, a data collection process is initiated based on the notification.

In some embodiments, detecting that the value for the WiFi network connectivity metric meets the particular criteria (operation 620) comprises one or more of: (a) determining that a packet drop rate is above a threshold packet drop rate value; (b) determining that a signal level for wireless signals associated with the client device is below a threshold signal level value; (c) determining that a latency value for wireless signals associated with the client device is greater than a threshold latency value; (d) determining that a number of retries for wireless signals associated with the client device is greater than a threshold retry value; (e) determining that a Round Trip Time (RTT) for data transmitted to and received from the client device is above a threshold RTT value; etc.

Figure 7:
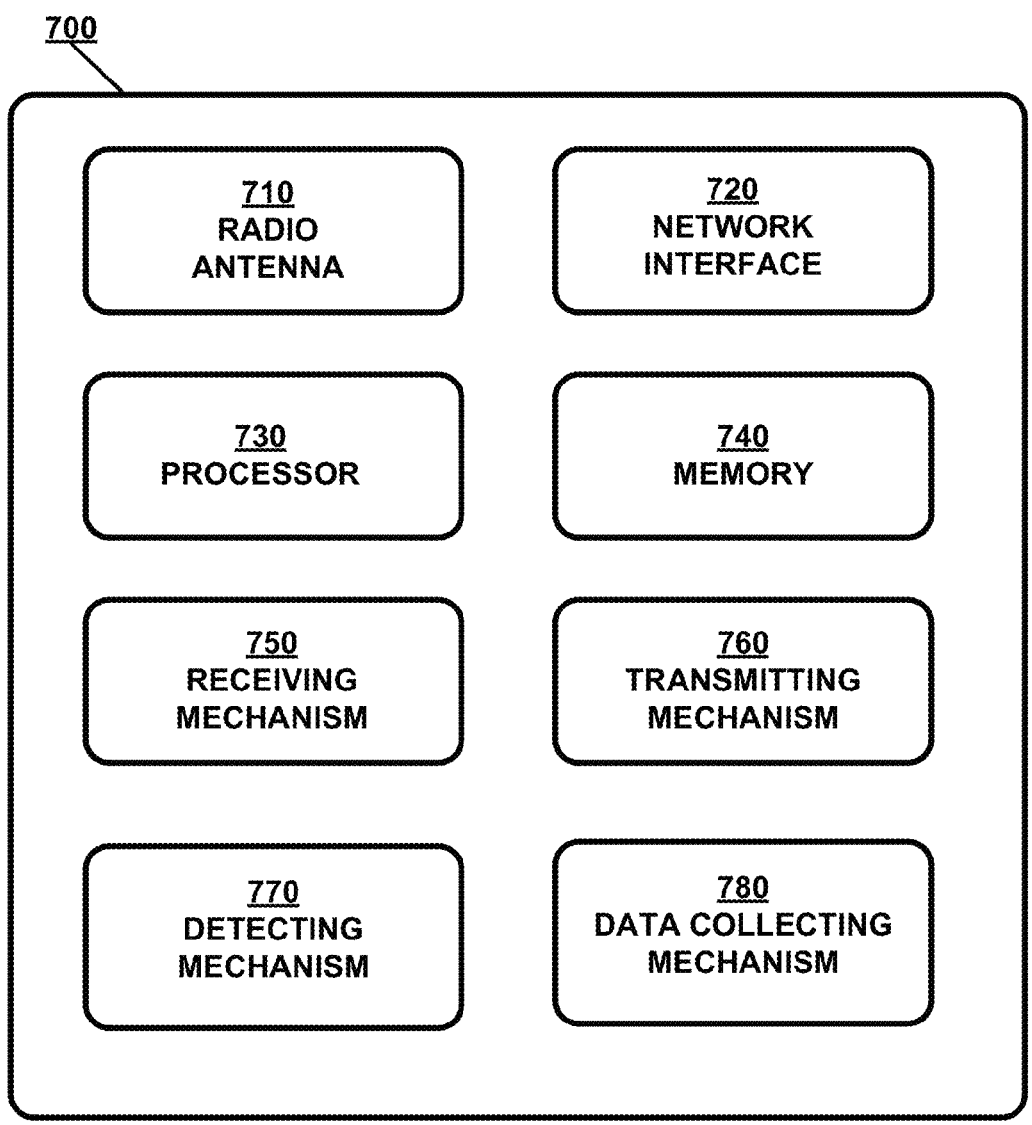
FIG. 7 is a block diagram illustrating a system for initiating data collection based on WiFi network connectivity metrics according to embodiments of the present disclosure.

System for Initiating Data Collection Based on WiFi Network Connectivity Metrics FIG. 7 is a block diagram illustrating a system for initiating data collection based on WiFi network connectivity metrics according to embodiments of the present disclosure.

Device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, a detecting mechanism 770, and a data collecting mechanism 780, all of which are in communication with processor 730 and/or memory 740 in device 700. Device 700 may be used as a client system, or a server system, or may serve both as a client and a server in a distributed or a cloud computing environment.

Radio antenna 710 is an optional component, and may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc. In some embodiments, memory 740 stores the data collected while the WiFi network connectivity metric meets the particular criteria.

Receiving mechanism 750 generally receives one or more set of operations or options configured by a network administrator regarding which data to be collected upon detecting that a WiFi network connectivity metric for a WiFi connection. Receiving mechanism 750 may also receive network messages that may include, but are not limited to, requests and/or responses, beacon frames, management frames, control path frames, and so on. The network messages may instruct device 600 to perform one or more data collection operations.

Transmitting mechanism 760 generally transmits collected data and/or a data collection request to a WLAN. Specifically, transmitting mechanism 760 may transmit the data to a network device identified by one or more devices associated with the WiFi network. In some embodiments, responsive to determining that the value meets the particular criteria, transmitting mechanism 760 transmits to one or more network devices corresponding to the WiFi network, via a mobile network a notification associated with the value meeting the particular criteria. Note that, the notification can include an indication that the client device has lost connectivity with the WiFi network. Furthermore, a data collection process can be initiated based on the notification.

Detecting mechanism 770 generally detects that a value for a WiFi network connectivity metric for a WiFi connection between a client device and a WiFi network meets a particular criteria. Specifically, detecting that the value for the WiFi network connectivity metric meets the particular criteria includes one or more of: (a) determining that a packet drop rate for packets transmitted to the client device or transmitted by the client device is above a threshold packet drop rate value; (b) determining that a signal level for wireless signals associated with the client device is below a threshold signal level value; (c) determining that a latency value for wireless signals associated with the client device is greater than a threshold latency value; (d) determining that a number of retries for wireless signals associated with the client device is greater than a threshold retry value; (e) determining that a Round Trip Time (RTT) for data transmitted to and received from the client device is above a threshold RTT value; (f) determining that a packet error rate for the packets transmitted to the client device or transmitted by the client device is above a threshold error rate value; etc.

In addition, detecting mechanism 770 can monitor a value for a WiFi network connectivity metric for a WiFi connection between the client device and a WiFi network; and detect that the value meets a particular criteria.

Data collecting mechanism 780 generally collects data associated with the one or more devices while the WiFi network connectivity metric meets the particular criteria. Moreover, data collecting mechanism 780 stops the data collection process responsive to determining that the value no longer meets the particular criteria. In some embodiments, data collecting mechanism 780 collects at a client device data that is specified by a network device.

Also, data collecting mechanism 780 may initiate a data collection process at a client device or a network device such as a network controller. In particular, data collection mechanism 780 initiates a data collection process for collecting data associated with one or more devices while the WiFi network connectivity metric meets the particular criteria responsive to determining that the value meets the particular criteria. In some embodiments, the initiating operation can be performed by the client device. In some embodiments, the initiating operation is performed by a network device monitoring the WiFi network connectivity metric for the WiFi connection between the client device and the WiFi network. In some embodiments, the determining operation is performed by a network device in response to receiving a request from a user of the client device.

Furthermore, data collecting mechanism 780 may initiate the data collection process based on determining that (a) a request for initiating the data collection process is received from the client device and (b) the client device is authorized to initiate the data collection process.

The data associated with one or more devices may include: (a) data collected by the client device; (b) data collected by an access point with which the client device is associated while the WiFi network connectivity metric meets the particular criteria; (c) data collected by a controller configuring an access point with which the client device is associated while the WiFi network connectivity metric meets the particular criteria; and/or (d) data collected by client devices other than said client device, the other client devices being selected based on a physical proximity or network proximity with said client device.

The data can be used to debug one or more connectivity issues resulting in the value for the WiFi network connectivity metric meeting the particular criteria. The WiFi connection between the client device and the WiFi network comprises a WiFi connection between the client device and any access point corresponding to the WiFi network.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors of a client device, cause the client device to:

detect that a value for at least one network connectivity metric for a connection between a client device and a network meets a criteria to indicate that the client device is having a network connectivity problem, wherein to detect the value for the at least one network connectivity metric comprises at least two of:

determining that a packet drop rate for packets transmitted to the client device or transmitted by the client device is above a threshold packet drop rate value;

determining that a signal level for wireless signals associated with the client device is below a threshold signal level value;

determining that a latency value for wireless signals associated with the client device is greater than a threshold latency value;

determining that a number of retries for wireless signals associated with the client device is greater than a threshold retry value;

determining that a Round Trip Time (RTT) for data transmitted to and received from the client device is above a threshold RTT value; and determining that a packet error rate for the packets transmitted to the client device or transmitted by the client device is above a threshold error rate value;

responsive to the detection that the value for the at least one network connectivity metric meets the criteria to indicate that the client device is having the network connectivity problem, transmit a data collection request to a controller that controls an access point with which the client device is associated;

initiate a data collection process to collect data by the client device while the client device is having the network connectivity problem; and store the data collected.

2. The non-transitory computer readable medium of claim 1, wherein the instructions further cause the client device to monitor the at least one network connectivity metric for the connection between the client device and the network.

3. The non-transitory computer readable medium of claim 1, wherein the client device is to transmit the data collection request to the controller based on an identifier of the controller that the client device previously received from the access point.

4. The non-transitory computer readable medium of claim 1, wherein the data collection request from the client device causes data to be collected by the access point with which the client device is associated.

5. The non-transitory computer readable medium of claim 1, wherein the data collection request from the client device causes data to be collected by the controller controlling the access point with which the client device is associated.

6. The non-transitory computer readable medium of claim 1, wherein the data collection request from the client device causes data to be collected by client devices other than said client device, the other client devices being selected based on a physical proximity or network proximity with said client device.

7. The non-transitory computer readable medium of claim 1, wherein the client device is to initiate the data collection process based on determining that the client device is authorized to initiate the data collection process.

8. The non-transitory computer readable medium of claim 1, wherein the data is used to debug the network connectivity problem.

9. The non-transitory computer readable medium of claim 1, wherein the connection between the client device and the network comprises a WiFi connection between the client device and any access point corresponding to the WiFi network.

10. The non-transitory computer readable medium of claim 1, wherein the data collection process comprises the client device collecting data that is specified by a network device.

11. The non-transitory computer readable medium of claim 1, wherein the instructions cause the client device to transmit the collected data to a network device identified by one or more devices associated with the network.

12. A method comprising:

monitoring, by a client device, a value for at least one network connectivity metric for a connection between the client device and a network;

detecting, by the client device, that the value for the at least one network connectivity metric meets a criteria to indicate that the client device is having a network connectivity problem, wherein the detecting comprises at least two of:

determining that a packet drop rate for packets transmitted to the client device or transmitted by the client device is above a threshold packet drop rate value;

determining that a signal level for wireless signals associated with the client device is below a threshold signal level value;

determining that a latency value for wireless signals associated with the client device is greater than a threshold latency value;

determining that a number of retries for wireless signals associated with the client device is greater than a threshold retry value;

determining that a Round Trip Time (RTT) for data transmitted to and received from the client device is above a threshold RTT value; and determining that a packet error rate for the packets transmitted to the client device or transmitted by the client device is above a threshold error rate value; and responsive to detecting that the value for the at least one network connectivity metric meets the criteria to indicate that the client device is having the network connectivity problem, transmitting, by the client device to a controller controlling an access point with which the client device is associated, a notification associated with the value for the at least one network connectivity metric and a data collection request; and initiating, by the client device, a data collection process to collect and store data associated with the client device.

13. The method of claim 12, wherein the notification comprises an indication that the client device has lost connectivity with the network.

14. The method of claim 12, wherein the data collection process is initiated based on the notification.

15. The method of claim 12, further comprising: stopping the data collection process responsive to determining that the value for the at least one network connectivity metric no longer indicates that the client device is having the network connectivity problem.

* * * * *